US012520407B2

(12) United States Patent
Crawley et al.

(10) Patent No.: US 12,520,407 B2
(45) Date of Patent: Jan. 6, 2026

(54) LIGHT SYSTEM WITH SYNCHRONIZED AUDIO PLAYBACK

(71) Applicant: The Difference LLC, Milwaukee, WI (US)

(72) Inventors: Terence Crawley, Brown Deer, WI (US); Nate Dowling, Las Vegas, NV (US)

(73) Assignee: The Difference LLC, Milwaukee, WI (US)

( * ) Notice: Subject to any disclaimer, the term of this patent is extended or adjusted under 35 U.S.C. 154(b) by 175 days.

(21) Appl. No.: 18/138,225

(22) Filed: Apr. 24, 2023

(65) Prior Publication Data

US 2023/0345604 A1 Oct. 26, 2023

Related U.S. Application Data

(60) Provisional application No. 63/334,257, filed on Apr. 25, 2022.

(51) Int. Cl.

*H05B 47/12* (2020.01)
*H05B 47/155* (2020.01)
*H05B 47/165* (2020.01)

(52) U.S. Cl.

CPC ........... *H05B 47/12* (2020.01); *H05B 47/155* (2020.01); *H05B 47/165* (2020.01)

(58) Field of Classification Search

CPC ..... H05B 47/12; H05B 47/155; H05B 47/165
USPC .......................................................... 315/307
See application file for complete search history.

(56) References Cited

U.S. PATENT DOCUMENTS

| | | | | |
|---|---|---|---|---|
| 4,158,982 | A | 6/1979 | Chusid | |
| 5,056,399 | A | 10/1991 | Hornstein | |
| 5,489,893 | A | 2/1996 | Jo et al. | |
| 6,000,493 | A * | 12/1999 | Chen | H04R 1/028 362/86 |
| 6,545,418 | B1 * | 4/2003 | Kolpasky | B60R 11/0223 315/80 |
| 6,652,132 | B1 * | 11/2003 | Hsueh | A01G 9/02 362/567 |
| 6,978,030 | B2 * | 12/2005 | Reich | H04R 1/02 381/124 |
| D568,867 | S * | 5/2008 | Parikh | D14/214 |
| 7,410,269 | B2 | 8/2008 | Harrity et al. | |
| 7,914,165 | B2 * | 3/2011 | Bertken | A47G 19/2227 362/97.3 |
| 7,993,042 | B2 | 8/2011 | Padilla | |

(Continued)

*Primary Examiner* — Ryan Jager

(74) *Attorney, Agent, or Firm* — Argus Intellectual Enterprise LLC; Daniel Enea; Jordan Sworen

(57) ABSTRACT

A light system with synchronized audio playback is provided. The light system includes a printed circuit board having a light array and an audio system. The light array has a plurality of light sources disposed on a first side of the printed circuit board, wherein the plurality of light sources is able to display an animation, including an audio reactive animation. The audio system is able to stream audio from a local non-transitory memory through a digital-to-analog (DAC) amplifier for final playback through a speaker. The audio system is able to provide an analog signal to a microcontroller for sampling during the display of the audio reactive animations. A second audio channel from the DAC amplifier is used to sample the audio playback for performing audio reactive LED animations.

18 Claims, 3 Drawing Sheets

(56) References Cited

U.S. PATENT DOCUMENTS

| | | | | |
|---|---|---|---|---|
| 8,275,144 | B2 * | 9/2012 | Logvinov | H04R 27/00 381/124 |
| 10,694,829 | B1 * | 6/2020 | Diamonds | B65D 23/04 |
| 11,156,353 | B2 * | 10/2021 | Diamonds | F21L 14/00 |
| 2008/0056507 | A1 * | 3/2008 | Logvinov | H04B 3/54 340/12.32 |
| 2009/0166378 | A1 * | 7/2009 | Stilley | B05B 11/0005 222/113 |
| 2009/0213602 | A1 | 8/2009 | Gallegos | |
| 2015/0201295 | A1 * | 7/2015 | Lau | H04R 29/008 381/59 |
| 2018/0049298 | A1 * | 2/2018 | Benoit | F21V 14/00 |
| 2023/0345604 | A1 * | 10/2023 | Crawley | H05B 47/165 |

* cited by examiner

LIGHT SYSTEM WITH SYNCHRONIZED AUDIO PLAYBACK

CROSS REFERENCE TO RELATED APPLICATION

This application claims the benefit of U.S. Provisional Application No. 63/334,257 filed on Apr. 25, 2022. The above identified patent application is herein incorporated by reference in its entirety.

BACKGROUND OF THE INVENTION

The present invention relates to a system and method of displaying a light and audio animation. The present invention specifically provides a light system with synchronization capabilities that associate audio playback with a light animation. The system includes a housing configured to receive a printed circuit board (PCB), which in turn is adapted to be used in conjunction with a bottle that has a compartment for receiving the housing.

There are many known devices for illuminating as part of an audiovisual display. Lighting devices have long been used as part of audiovisual displays, especially in entertainment settings such as bars, clubs, and concert halls. For example, neon lights are considered entertainment lighting with the primary intent to provide a pleasing aesthetic effect. Most of these lights are static in nature. Their brightness and color may be varied, but their positions typically do not change. Entertainment lighting systems for static locations, such as discos, can be more sophisticated as a result of illuminating an immobile area.

Existing products that comprise a lighted element lack the capability of the user to control and direct the light system of their personal lighted object. Typically, there is an on or off button that provides a momentary lighted element. There is no customization or interchangeability permitted within many of these devices, leading to minimal or one-time novelty use of these products.

Additionally, lights are often used for the creation of entertainment and forming shared experiences. However, one significant deficiency of these traditional lighting systems is their lack of interactivity, which can make them less engaging for users. This lack of interactivity is a common problem with many marketing products, which can fail to capture consumers' attention and create a memorable experience. In one instance, some concertgoers may use their cell phone screens to illuminate the crowd. However, this effect is sporadic and not visual from all areas of the concert.

The present invention automatically creates a visually captivating effect that synchronizes with music without requiring active participation from individual users. As the light system synchronizes with music, the display can evoke an emotional response from users, creating a sense of shared excitement and engagement that enhances the overall concert experience. The immersive and interactive nature of the light system also allows users to engage with each other and create a shared experience that can contribute to a sense of community.

Additionally, the successful marketing of products is not limited to the quality or type of product itself, but also by the packaging and experience associated with the product. In many venues, such as concert halls and clubs, beverages and other products are carried by many individuals, wherein these products can be used as an additional means to provide audiovisual entertainment.

The present invention seeks to bring a lighting and audio system to each person at an entertainment venue by housing the system within a beverage container or other housing. The lighting and audio system is capable of displaying lights in synchronization with audio from the device. In this way, the lighting system is configured to enhance an experience for each user. In some uses, a group of users can each carry a lighting system of the present invention such that the group enjoys a shared musical experience, thereby promoting the beverage product and the musical work.

In light of the devices disclosed in the known art, it is submitted that the present invention substantially diverges in design elements and methods from the known art and consequently it is clear that there is a need in the art for an improvement of lighting systems with synchronized audio playback. In this regard the instant invention substantially fulfills these needs.

SUMMARY OF THE INVENTION

In view of the foregoing disadvantages inherent in the known types of light systems now present in the known art, the present invention provides a new light system with audio synchronization wherein the same can be configured within a housing, such as a beverage bottle, wherein the audio and light animations can be played therein.

It is an objective of the present invention to provide a light system having a printed circuit board, also known as a PCB, having components for powering the device, one or more lights for displaying the animations, an audio system for producing the sound from stored memory, and a playback system for synchronizing the audio and lights.

It is another objective of the present invention to provide a light system having a puck like design that is sized and configured to be seated within a housing for storage in an in-use configuration.

It is another objective of the present invention to provide a light system having an audio subsystem that controls the streaming of audio data from a non-transitory medium, such as memory of an SD card, wherein a Digital-to-analog, also known as a DAC, conversion occurs, and an amplifier causes final playback through a speaker. The audio system also provides an analog signal for sampling during the display of light animation as audio reactive animations.

It is yet another objective of the present invention to provide a light system with a removable stored memory, such that different audio files can be played through the system.

It is yet another objective of the present invention to provide a light system having an interface, such as a multifunction button, that is actuatable for transiting between different modes of the light and audio system. For example, in a first mode, the LED animation and audio from the speaker is active and synchronized. In a second mode, the LED animation is performed without the production of audio from the speakers. In a third mode, a predetermined LED animation is performed.

It is therefore an object of the present invention to provide a new and improved light and audio system that has all of the advantages of the known art and none of the disadvantages.

Other objects, features, and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings.

DETAILED DESCRIPTION OF THE INVENTION

Reference is made herein to the attached drawings. For the purpose of presenting a brief and clear description of the present invention, the preferred embodiment will be discussed as used for performing a light and audio animation within a pocket of a beverage container, such as a water bottle. The figures are intended for representative purposes only and should not be considered to be limiting in any respect.

Reference will now be made in detail to the exemplary embodiment (s) of the invention. References to "one embodiment," "at least one embodiment," "an embodiment," "one example," "an example," "for example," and so on indicate that the embodiment(s) or example(s) may include a feature, structure, characteristic, property, element, or limitation but that not every embodiment or example necessarily includes that feature, structure, characteristic, property, element, or limitation. Further, repeated use of the phrase "in an embodiment" does not necessarily refer to the same embodiment.

As used herein, "computer-readable medium" or "memory" excludes any transitory signals, but includes any non-transitory data storage circuitry, e.g., buffers, cache, and queues, within transceivers of transitory signals. As used herein, "logic" refers to (i) logic implemented as computer instructions and/or data within one or more computer processes and/or (ii) logic implemented in electronic circuitry.

Figure 1:
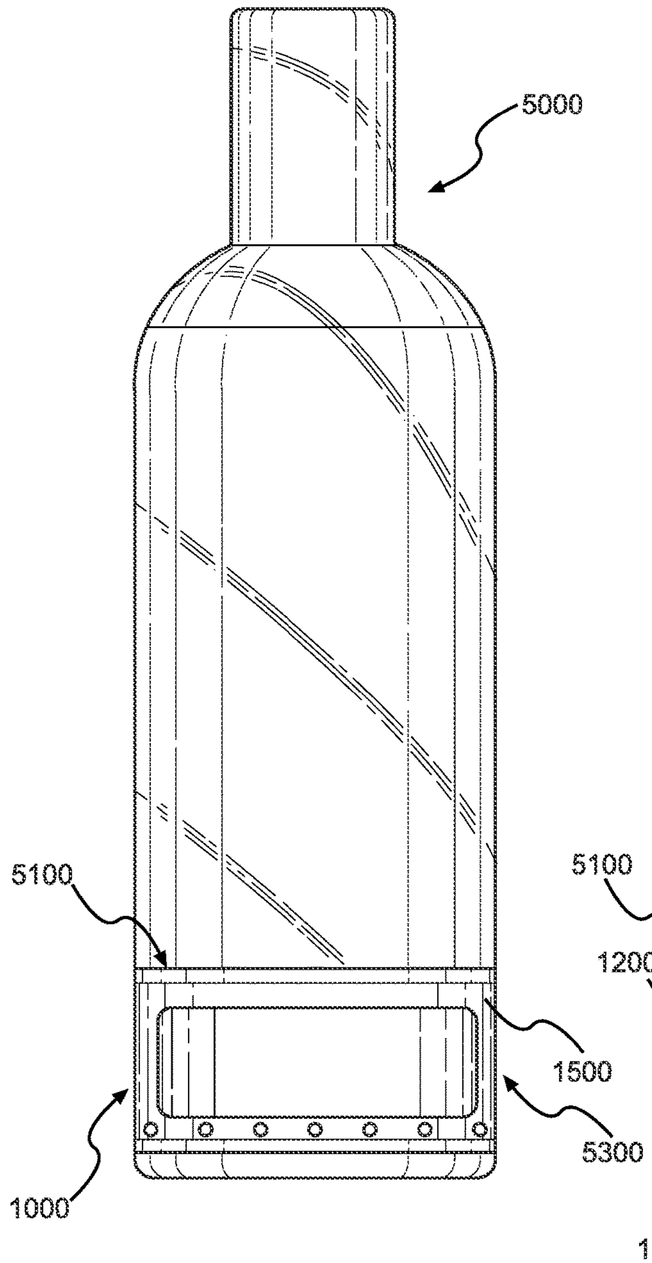
FIG. 1 shows a front view of one embodiment of the lighting system positioned within a compartment of a bottle.
Figure 2:
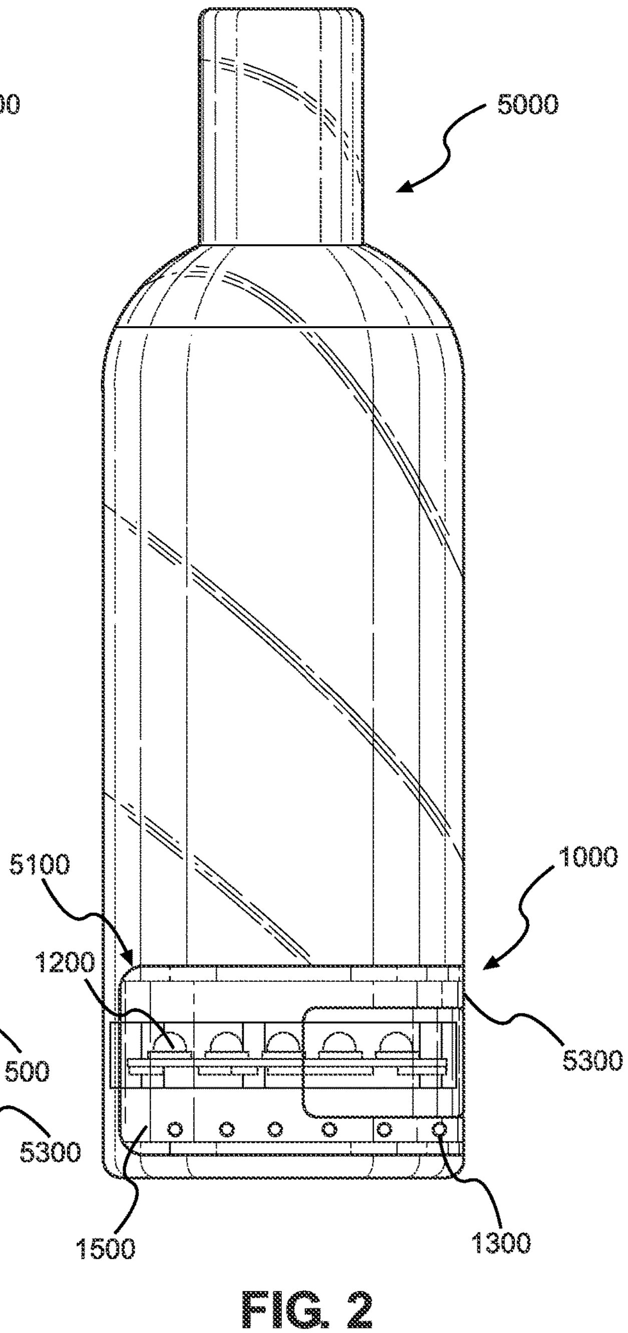
FIG. 2 shows a side view of one embodiment of the lighting system positioned within a compartment of a bottle.

Referring now to FIGS. 1 and 2, there is shown a front and side view of one embodiment of the lighting system positioned within a compartment of a bottle, respectively. The lighting system 1000 provides a device that includes a plurality of lights and a speaker that is portable and adapted to housed within another item, such as a bottle 5000.

Figure 3:
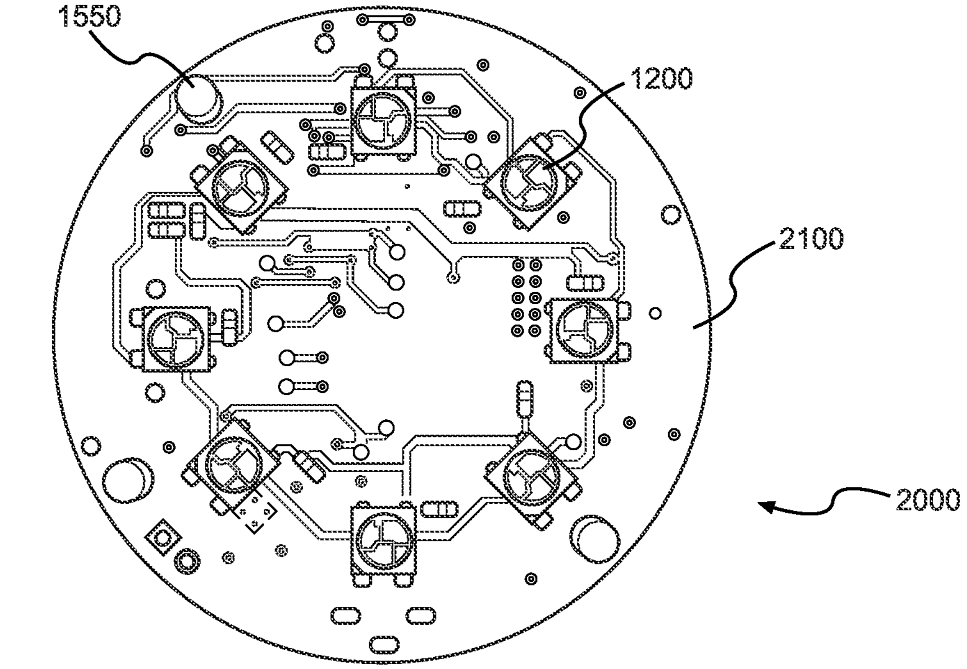
FIG. 3 shows a schematic view of one embodiment of a first side of the PCB.
Figure 4:
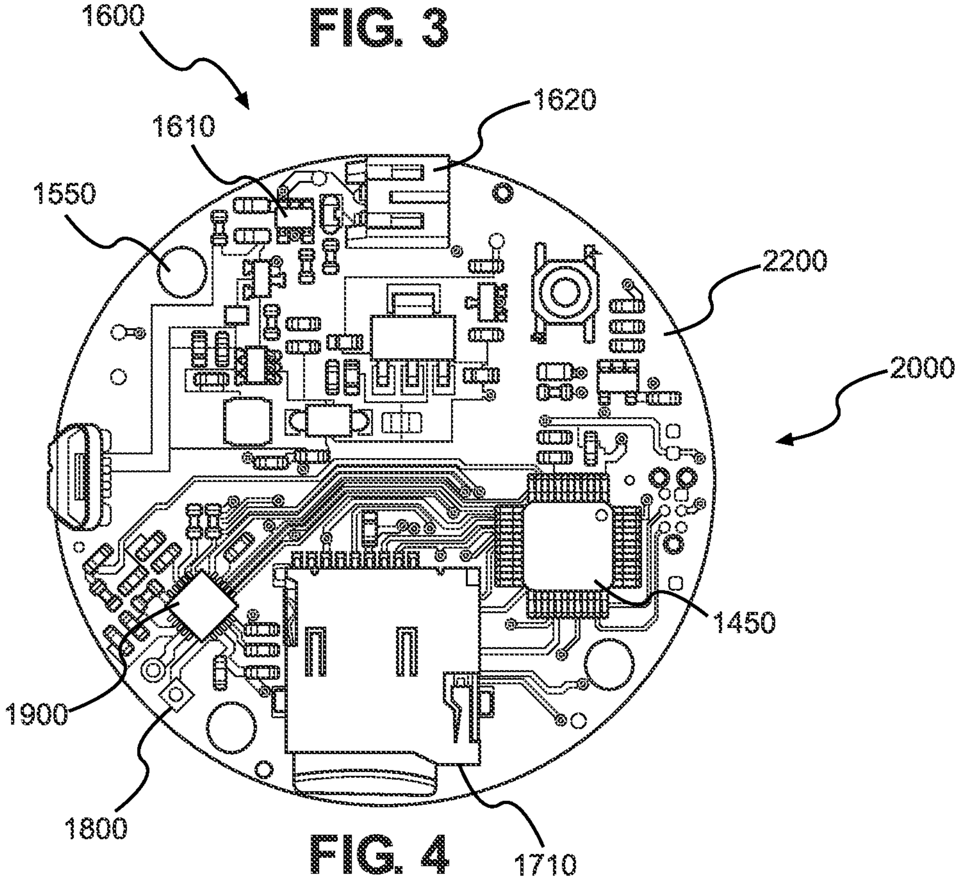
FIG. 4 shows a schematic view of one embodiment of a second side of the PCB.

In one embodiment, the lighting system 1000 comprises a printed circuit board (PCB) 1100 having a light array 1200 and an audio system 1300 (best shown in FIGS. 3 and 4). The light array 1200 is adapted to display an animation. In some embodiments, the light array 1200 includes RGB LEDs and arranged in a pattern, such as a circle. A wide variety of light animations are programable or may occur in reaction to the audio being played by the audio system 1300. The light array 1200 can be used to create a wide range of colors, which can be combined with different patterns and transitions to create dynamic and visually engaging effects. The light array 1200 can be programmed to display static patterns or dynamic animations that move, pulse, or change in response to sound or other external stimuli. For example, the lights can be programmed to display a pulsing pattern (dynamic) that reacts to the beat of music being played through the accompanying audio system. Alternatively, the lights can be programmed to display a static pattern that changes in response to external stimuli, such as a user input or a sensor reading. The lights can also be programmed to display custom patterns or animations, which can be created by users. In addition to the circle arrangement of light array 1200, other arrangements are also possible. For example, the light array 1200 could be arranged in a linear or grid formation, allowing for different patterns and animations. The light array 1200 could also be arranged in a 3D structure, such as a sphere or cube, adapted to create an immersive lighting effect.

In the shown embodiment, the lighting system 1000 is positioned within a compartment 5100 of the bottle 5000. In one embodiment, the compartment 5100 is positioned at the lower end of the bottle 5000 and is accessible through an opening 5300 on the sidewall of a bottle 5000. The opening 5300 may be covered by a removable cap or other closure means, which can be easily opened and closed to insert or remove the lighting system 1000. In alternative embodiments, the compartment 5100 may be located at other positions along the bottle, such as in the middle or upper portions of the bottle 5000. The opening 5300 may also be located at different positions, such as at the bottom of the bottle 5000 or at the top of the bottle 5000. The size and shape of the compartment 5100 can also vary depending on the type of bottle and the functional requirements of lighting system. For example, the compartment 5100 may be cylindrical, rectangular, or irregularly shaped to fit the specific bottle design. In addition to glass bottles, the compartment 5100 is adapted to be included in other types of beverage containers, such as plastic bottles, aluminum cans, or other materials commonly used in the beverage industry. The lighting system 1000 can be adapted to fit the specific requirements of each container type, including size, shape, and material considerations.

In the illustrated embodiment, the entire compartment 5100 is composed of a transparent material to allow the lighting to be visible therethrough. In alternate embodiments, a sidewall of the compartment is transparent, wherein a top and bottom of the compartment are not transparent. In yet another embodiment, any suitable wall is configured to be transparent to allow the lighting to be visible therethrough. In some embodiments, a wall is translucent to provide a different lighting effect to be visible therethrough.

In one embodiment, the audio system 1300 is configured to stream audio from a local non-transitory memory through a digital-to-analog conversion and an amplifier for a final playback through a speaker. The digital-to-analog conversion hereinafter may be referred to as the "DAC". The audio system 1300 is configured to provide an analog signal to a microcontroller for sampling during the display of the audio reactive animations. Audio sampling is the process of capturing and converting analog sound waves into digital signals that can be stored and manipulated by computers. The audio waveform is sampled at regular intervals, and each sample is represented by a numerical value that corresponds to the amplitude of the waveform at that point in time. To create animations that match the sounds of the audio, the audio signal can be analyzed to extract information about its frequency, amplitude, and other characteristics. This information can then be used to control the intensity, color, and other properties of lights in real-time.

Referring to FIGS. 3 and 4, there is shown a schematic view of one embodiment of a first side and a second side of the PCB, respectively. In the shown embodiment, the PCB 2000 incorporates the light array 1200 and an audio system 1300 on the first side 2100 and second side 2200 thereof.

Figure 5:
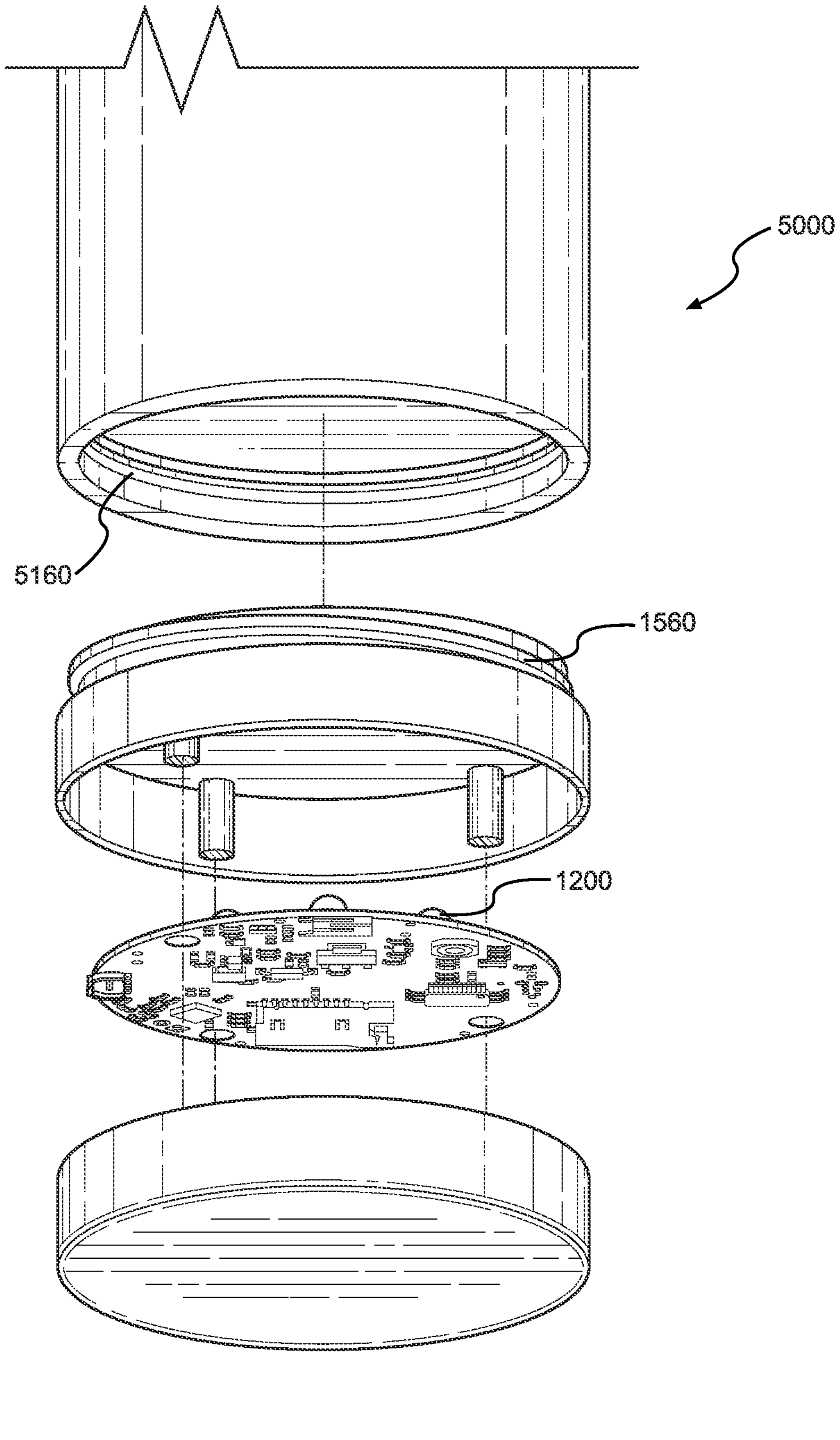
FIG. 5 shows a perspective view of one embodiment of the lighting system positioned within a compartment of a bottle.

The light array 1200 is configured to display various animations, including audio reactive animations. The audio system 1300 is adapted to stream audio from a local non-transitory memory through a digital-to-analog conversion and an amplifier for final playback through a speaker. In one embodiment, a microcontroller 1450 operates the system. In another embodiment, the microcontroller is in wireless communication with a processor that controls the system. The PCB is shown in FIGS. 1, 2, and 5 as being positioned within a housing 1500. The PCB and housing hereinafter may be referred to as the "puck". In the illustrated embodiment, the housing 1500 comprises a closed lower end, closed upper end, and a sidewall extending therebetween. The PCB is secured within the housing to prevent movement thereof within the housing. In the shown embodiment, the housing is entirely transparent, however, in alternate embodiments, the housing comprises one ore more transparent walls to allow the lighting to pass therethrough. In some embodiments, the housing is not transparent, but comprises a plurality of apertures configured to allow light to pass therethrough. In some embodiments, each aperture is aligned with a particular light source.

Specifically referring to FIG. 3, the first side 2100 includes various electrical components for operation, including a power system. In the shown embodiment, the power system 1600 comprises a charge controller 1610 and a battery 1620. The power system regulates the various voltages required for system operation and provides a charge controller 1610 to manage the charge and discharge of a battery 1620. In the shown embodiment, there are several power rails necessary for operation of the puck. The microcontroller, DAC amplifier, and SD card require 3.3V, the DAC amplifier requires an additional 1.8V rail, the RGB LEDs and the charge controller are 5V devices, and the LiPo battery functions at various voltage levels as it discharges. The SD card and corresponding receiver are positioned on the second side 2200 of the PCB 2000. In the shown embodiment, fasteners 1550 are positioned around and through the PCB 2000 to secure the PCB within the housing 1500.

In one embodiment, power path management is necessary to ensure that the battery is not used to power the application circuit while being charged. If this condition was allowed the battery would enter an indeterminate charge state where current flows into the battery while current is flowing out, never allowing it to charge completely. The current control system is configured to allow the battery to provide application power during normal operation, but to terminate the connection to the battery from the application automatically the moment a charging power source is connected. Then the charging power delivers current to both the charge controller to raise the battery level, and to power the system. Due to this, in the illustrated embodiment, a charging circuit capable of delivering at least 500 mA is necessary which is within the capabilities of USB 2.0, and a micro-USB Type B connector is provided for that purpose.

In one embodiment, the battery 1620 is a lithium polymer battery, which is beneficial to the system due to the energy density available in the compact form factor, and the ease of managing the battery charging cycle. Any standard 3.7V nominal LiPo batteries can be used that supports a maximum charged voltage of 4.2V. In the illustrated embodiment, a 1100 mAh capacity provides an estimated 10 hours of constant playback and LED animation. This operational time can be extended by controlling the brightness of the LEDs and lowering the volume of the audio output. In one embodiment, a remote controller is operably connected to the system which allows for controls to be wirelessly communicated. In one embodiment, the puck comprises buttons that may be actuated for controlling the system.

In the shown embodiment, the light array 1200 comprises eight programmable LEDs 1240 arranged in a circular pattern on the top side copper of the PCB. The LEDs 1240 are programmable using a one wire serial interface, over the LED DIN pin. The LED packages are then connected in series DOUT to DIN, allowing the full chain to be programmed by the microcontroller over the serial connection. Each color channel (red, green, blue) is 8 bits wide, accepting a value from 0-255, which allows color and brightness mixing to be performed by adjusting that value for each color channel of each LED. A termination resistor of 470Ω is placed in series between the microcontroller and the first LED, as well as a pair of 22 uF capacitors to provide bulk capacitance and avoid sagging of the 5V rail at higher brightness and rapid color changes. While the three-color channels are how the LEDs are controlled, many animation algorithms use a "Hue-Saturation-Value" definition of color rather than discrete red, green, blue values. In some embodiments, this requires conversion between the two-color systems programmatically.

In one embodiment, the microcontroller implements the one-wire signaling method for the RGB LEDs using PWM over DMA. The WS2812B datasheet specifies the required high/low duty cycles that describe a logical one or zero, and those times are encoded onto an 800 kHz PWM output. The full array of bytes describing the color channel data for each of the eight LEDs plus the required zero pulse width reset sequence indicating end-of-transmission are written to a buffer in memory, which is then used as the DMA location from which the PWM peripheral reads. Data is always written to the LED array in the GREEN/RED/BLUE color channel sequence, however, color values are typically understood in RED/GREEN/BLUE, so a C function has been written to transcode those values from RGB to GRB. The color animation sequences are also commonly encoded using HUE/SATURATION/VALUE. This allows an easy transition between colors as the HUE value is the only portion that requires cycling in an algorithm.

Specifically referring to FIG. 4, the second side 2100 includes an SD card receiver 1700 for removably receiving an SD card 1710, a speaker 1800, and the DAC amplifier 1900. Audio playback is performed by reading the contents of an appropriately formatted audio file from an SD card, streaming that data to the DAC amplifier 1900 using the I2S protocol which then converts the digital audio data back into an analog signal, that is then amplified by the same chip for use by the speaker 1800. The second audio channel from the DAC amplifier 1900 is used to sample the audio playback for performing audio reactive LED animations.

In one embodiment, the second audio channel from the DAC amplifier 1900 is sampled by the microcontroller to determine the sound pressure level and perform animations based on those values. The microcontroller first configures the DAC amplifier for audio playback using the I2C peripheral. These configurations are used to set the internal clock source of the DAC Amplifier to External Sourced, enable Mute on Startup, and enable output to the speaker amplifier internal subsystem.

In one embodiment, while the DAC amplifier supports a variety of audio data encoding formats, the Puck is designed to specifically support one format for ease of implementation: a stereo WAV file with a 44.1 kHz sample rate and 16-bit sample depth. Because only a single speaker is used, the stereo data should be mixed down, so the same audio is played on both left and right channels.

In one embodiment, the microcontroller uses the FatFS library to access the SD card, so the SD Card should be formatted as FAT-32. In other embodiments, any size SD card is supported, however 16 GB is more than sufficient, and no special speed requirements exist.

In one embodiment, the audio file is opened by the FatFS library, and an initial tranche of data is read from it to fill a 2048 byte. This buffer is then used by the I2S peripheral and DMA to transmit the contents of the buffer to the DAC Amplifier. The I2S peripheral is triggered to interrupt with each half-buffer read, so that as it transmits the top or bottom half of the buffer to the DAC, the other half of the buffer is being refilled with the next 1024 bytes of audio data from the SD card. This continues in sequence until either the end of the file is reached, or the user presses the multifunction button to end playback. In either instance, a formal file close operation is executed to leave the SD card file system in a clean state.

In one embodiment, in order to implement the audio reactive LED animation feature, the audio being played must be communicated to the microcontroller in a way that allows it to perform analysis of the signal levels. In some embodiments, the microcontroller is not powerful enough to perform internal decoding of the PCM audio data, so it must sample the analog output from the DAC Amplifier using a 10-bit ADC. The audio output from the amplifier is consistent with a Class-D Amplification PWM signal and must be converted to a true analog sine wave through the implementation of a second order low pass filter. It is this output from the filter that is provided to the ADC for sampling. The use of 10-bit sampling was determined to provide adequate detail of the audio signal, without requiring the timing overhead of a full 12-bit sample depth. The ADC is configured to perform the analog to digital conversion in a non-blocking fashion using an interrupt vector, and the returned value is then used to update the LED display.

In the illustrated embodiment, a single user interface is exposed to the end user by way of a Normally Open Momentary Switch. The button signal is processed in hardware by a debounce circuit to remove any mechanical signal flutter caused by the internal mechanisms of the physical switch. In the illustrated embodiment, 20 ms was selected to provide a balance between eliminating possible button bounce and end user perception of input latency. In the illustrated embodiment, the passive values for the debounce circuit were derived from the time constant formula for the charging of a capacitor, using a standard 1 uF value for C and calculating the minimum value for the discharging resistor and the total value for the R1+R2 charging resistance.

In one embodiment, there are two operational states for the puck: audio playback and stop audio playback. The audio playback state is entered by device power on/reset. The Stop Audio Playback is entered by a user press of the multifunction button, incrementing the device state flag which is interpreted in the while (1) loop within main to gracefully end audio playback and begin a constant animation. This framework allows for further production development of multiple device states through which an end user can move through actuation of the multifunction button.

Referring to FIG. 5, there is shown another embodiment of the perspective view of one embodiment of the lighting system positioned within a compartment of a bottle. In the shown embodiment, the bottle 5000 includes a fastener 5160 at the lower end thereof, such as threads, that removably secure the puck to the bottle 5000 via a mating fastener 1560. The speaker is positioned such that audio is played through the second end and the light array 1200 is oriented into the bottle 5000. As the LEDs of the light array 1200 illuminate, the contents of the bottle 5000 can disperse the light creating an eye-catching display.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly, and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A light system with synchronized audio playback, comprising:

a printed circuit board (PCB) having a light array and an audio system;

the light array adapted to display an animation, including an audio reactive animation;

the audio system configured to stream audio from a local non-transitory memory through a digital-to-analog conversion and an amplifier for a final playback through a speaker;

wherein the audio system is configured to provide an analog signal to a microcontroller for sampling during the display of the audio reactive animations.

2. The light system of claim 1, wherein the PCB includes a power system configured to regulate voltages required for system operation and includes a charge controller to manage the charge and discharge of a battery.

3. The light system of claim 1, further comprising a controller having a multifunction switch adapted to change playback configurations of the light array and the audio system.

4. The light system of claim 1, wherein the light array comprises a plurality of light sources.

5. The light system of claim 4, further comprising a housing that receives the PCB such that the plurality of light sources emit light through the housing.

6. The light system of claim 5, wherein the housing is in the shape of a puck.

7. The light system of claim 5, wherein the plurality of light sources emit light through corresponding apertures of the housing.

8. The light system of claim 5, further comprising a beverage bottle, that includes a compartment sized to receive the housing, wherein the PCB is positioned within the compartment and the light array is oriented to illuminate a main interior chamber of the beverage bottle.

9. The light system of claim 8, wherein the beverage bottle is semitransparent.

10. The light system of claim 4, wherein the light array is disposed on a first side of the PCB.

11. The light system of claim 10, wherein the audio system is disposed on a second side of the PCB opposite the first side.

12. The light system of claim 11, wherein the local non-transitory memory is removable from a memory receiver on the second side of the PCB.

13. The light system of claim 1, wherein the sampling comprises an audio channel that is sampled by the micro-controller.

14. The light system of claim 13, wherein the microcontroller is configured to determine a corresponding sound pressure level of the audio and perform light animations based on those sound pressure level values.

15. The light system of claim 13, wherein the audio reactive animation comprises a sampling which results in a matching light emissions of a plurality of light source of the light array that corresponds to the audio.

16. The light system of claim 1, wherein the microcontroller, the non-transitory memory, and the lights are integrated on the printed circuit board.

17. The light system of claim 1, wherein the sampling during the display of the audio reactive animations comprises capturing and converting the analog audio signal into digital values at regular intervals, each value corresponding to an amplitude of the audio waveform at that interval.

18. The light system of claim 17, wherein the microcontroller is configured to analyze sampled data to extract frequency, amplitude, or other characteristics of the audio signal to control the intensity, color, or other properties of the lights in real time.

* * * * *